United States Patent
Bleiweiss (10) Patent No.: US 9,898,688 B2
(45) Date of Patent: Feb. 20, 2018

(54) VISION ENHANCED DRONES FOR PRECISION FARMING

(71) Applicant: Intel Corporation, Santa Clara, CA (US)

(72) Inventor: Amit Bleiweiss, Yad Binyamin (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/169,972

(22) Filed: Jun. 1, 2016

(65) Prior Publication Data
US 2017/0351933 A1    Dec. 7, 2017

(51) Int. Cl.
| | |
|---|---|
| G06K 9/00 | (2006.01) |
| G06K 9/62 | (2006.01) |
| G06T 7/40 | (2017.01) |
| G06T 17/05 | (2011.01) |
| B64C 39/02 | (2006.01) |

(52) U.S. Cl.
CPC ............ *G06K 9/627* (2013.01); *B64C 39/024* (2013.01); *G06K 9/00201* (2013.01); *G06T 7/408* (2013.01); *G06T 17/05* (2013.01); *B64C 2201/123* (2013.01); *B64C 2201/141* (2013.01); *B64C 2201/146* (2013.01); *G06T 2207/10024* (2013.01); *G06T 2207/10028* (2013.01); *G06T 2207/10032* (2013.01); *G06T 2207/20081* (2013.01); *G06T 2207/20084* (2013.01); *G06T 2207/30188* (2013.01); *G06T 2207/30244* (2013.01)

(58) Field of Classification Search
CPC ............ B64C 39/024; B64C 2201/123; B64C 2201/141; B64C 2201/146; G06K 9/6267; G06K 2209/17; A01B 79/005
USPC .................................................. 382/156–159
See application file for complete search history.

(56) References Cited

U.S. PATENT DOCUMENTS

| | | | |
|---|---|---|---|
| 2016/0106038 A1* | 4/2016 | Boyd ................... | A01D 41/141 56/10.4 |
| 2016/0148104 A1* | 5/2016 | Itzhaky ................... | G06N 5/04 706/12 |
| 2016/0196688 A1* | 7/2016 | Bergman ................ | G06T 17/05 345/420 |
| 2017/0032258 A1* | 2/2017 | Miresmailli ............. | A01G 7/00 |

OTHER PUBLICATIONS

Vineview, "Scientific Aerial Imaging", vineview.com, retrieved Apr. 13, 2016, 1 page.

* cited by examiner

*Primary Examiner* — Daniel Mariam
(74) *Attorney, Agent, or Firm* — Jordan IP Law, LLC (57) ABSTRACT

Methods, apparatuses and systems may provide for a neural network that analyzes and classifies agricultural conditions based on depth data and color data recorded by one or more drones, and generates an annotated three dimensional (3D) map with the agricultural conditions. Additionally, an object recognition model may be trained for use by a drone controller to trigger drones to conduct a collection of depth data at an increased proximity to crop-related objects based on agricultural conditions.

21 Claims, 8 Drawing Sheets

VISION ENHANCED DRONES FOR PRECISION FARMING

TECHNICAL FIELD

Embodiments generally relate to identifying agricultural conditions. More particularly, embodiments relate to object recognition and agricultural condition classification techniques that facilitate generating an annotated three dimensional (3D) map with the agricultural conditions.

BACKGROUND

Global imaging processing algorithms may be used in agriculture to capture (e.g., record) images that typically do not produce a standard color image. Hyperspectral and/or multispectral imaging may also be used in agriculture, but conventional hyperspectral and/or multispectral images may typically be captured from relatively high elevations so that simple analysis may detect chlorophyll levels in plants. Normalized Difference Vegetation Index (NDVI) may also be used to automate produce farming. Although NDVI may give a farmer a high level overview of the health status of crops, NDVI may be mostly based on low level features (e.g., colors, edges, etc.). NDVI may therefore result in several ambiguities such as, for example, incorrectly detecting damage caused by mole burrowing as a stockpile. In addition, while drones may be in use today in agriculture, the analysis may be largely based on simple near infrared (IR) image processing techniques, which produce maps that fail to provide agriculture details needed to distinguish between different types of damage.

BRIEF DESCRIPTION OF THE DRAWINGS

The various advantages of the embodiments will become apparent to one skilled in the art by reading the following specification and appended claims, and by referencing the following drawings, in which:

DETAILED DESCRIPTION

Figure 1:
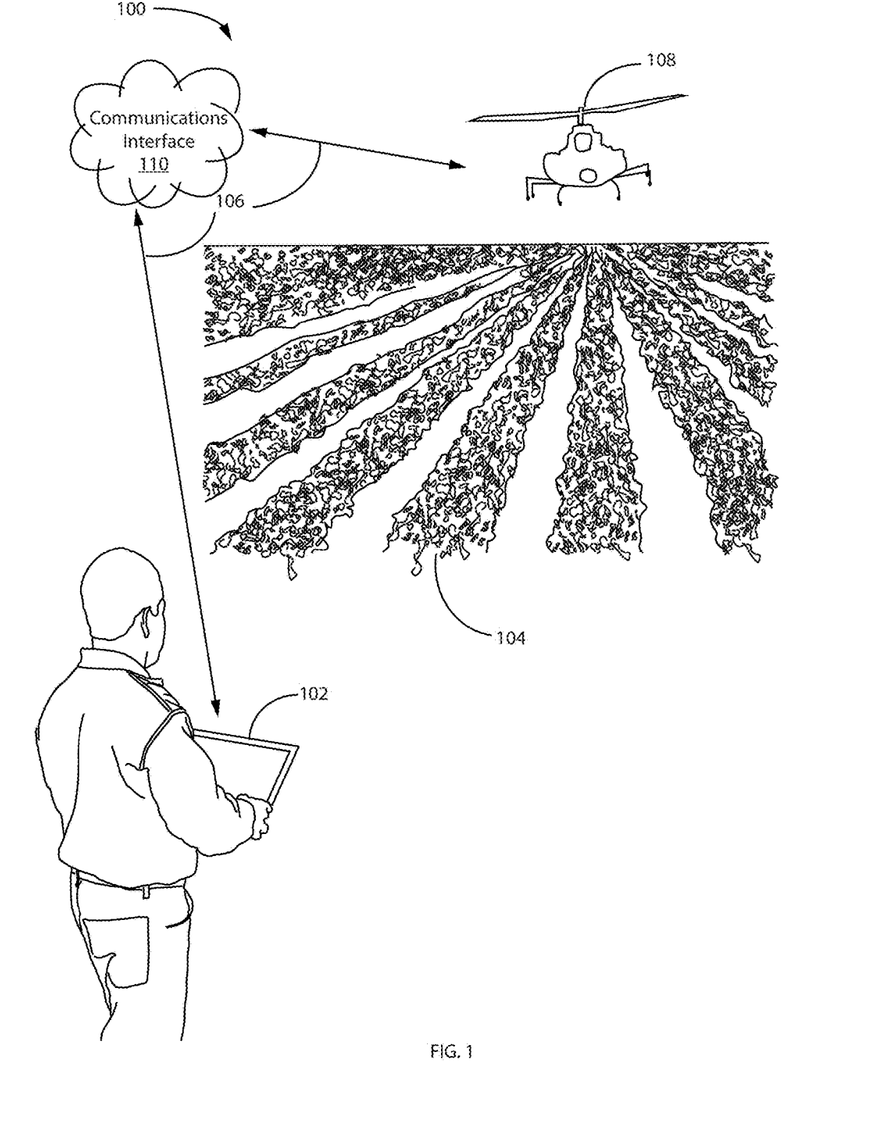
FIG. 1 is an illustration of an example of a vision enhanced drone system deployed in a farming environment according to an embodiment.

Turning now to FIG. 1, diagram 100 illustrates an example of a vision enhanced drone system 102 deployed in an agricultural environment 104 according to an embodiment. A user (e.g., farmer) may use the vision enhanced drone system 102 deployed on a mobile device (e.g., a mobile phone, tablet or laptop) in the agricultural environment 104 to exchange one or more signals 106 (e.g., communicate) with one or more drones 108 (e.g., aerial and/or terrain based drones) via a communications interface 110 (e.g., to a network, wireless local area network/WLAN such as WiFi).

The vision enhanced drone system 102 may use the drones 108 to capture/record three dimensional (3D) information including depth data and color data. The drones 108 may also provide inertia data to the vision enhanced drone system 102. As will be discussed in greater detail, the vision enhanced drone system 102 may generate a 3D map of the agricultural environment 104 (including, e.g., outdoor spaces and interior spaces such as a green house, warehouse or canopied area) from the depth data and color data captured/recorded by the drones 108 for the user to view (e.g., via a graphical display).

The vision enhanced drone system 102 may conduct analysis on crop-related objects (e.g., vegetation including fruits and vegetables) in the agricultural environment 104 captured/recorded by the drones 108. The system 102 may also identify the crop-related objects and one or more agricultural condition classifiers to determine the agricultural conditions of the agricultural environment 104 and the crop-related objects.

The vision enhanced drone system 102 may further annotate the 3D map with the agricultural conditions of the agricultural environment 104 and the crop-related objects, and communicate the annotated 3D map to the graphical display of the mobile device for the user to view. The user may direct the one or more drones to increase proximity to one or more of the crop-related objects based on the 3D map and/or the enhanced 3D map. The vision enhanced drone system 102 may also, without user interaction, automatically direct one or more drones to increase proximity (e.g., move closer) to one or more of the crop-related objects identified in order to confirm the condition of the crop-related objects.

Figure 2:
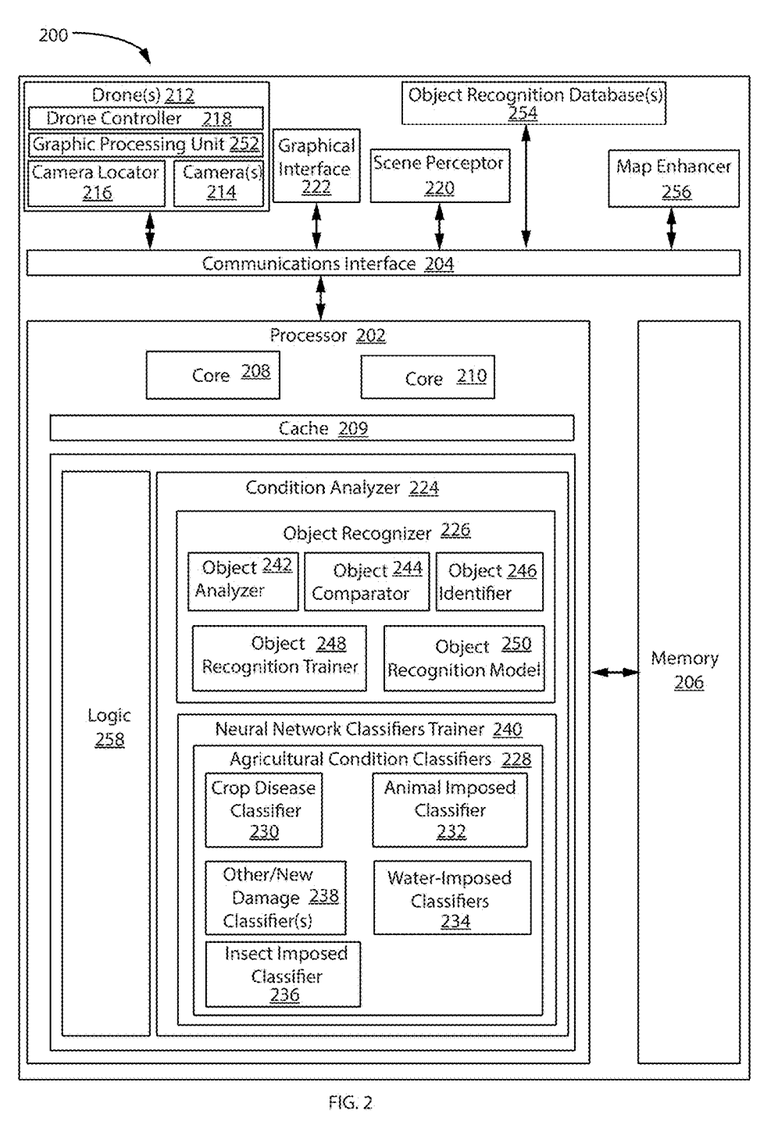
FIG. 2 is a block diagram of a vision enhanced drone system according to an embodiment.

FIG. 2 is a block diagram of a vision enhanced drone system 200 according to an embodiment. The vision enhanced drone system 200, which may be readily substituted for the system 102 (FIG. 1), already discussed, may include a processor 202, a communications interface 204 and memory 206 coupled to the processor 202. The memory 206 may be external to the processor 202 (e.g., external memory), and/or may be coupled to the processor 202 by, for example, a memory bus. In addition, the memory 206 may be implemented as main memory. The memory 206 may include, for example, volatile memory, non-volatile memory, and so on, or combinations thereof. For example, the memory 206 may include dynamic random access memory (DRAM) configured as one or more memory modules such as, for example, dual inline memory modules (DIMMs), small outline DIMMs (SODIMMs), etc., read-only memory (ROM) (e.g., programmable read-only memory (PROM), erasable PROM (EPROM), electrically EPROM (EEPROM), etc.), phase change memory (PCM), and so on, or combinations thereof. The memory 206 may include an array of memory cells arranged in rows and columns, partitioned into independently addressable storage locations.

The vision enhanced drone system 200 may include cores 208, 210 that may execute one or more instructions such as a read instruction, a write instruction, an erase instruction, a move instruction, an arithmetic instruction, a control instruction, and so on, or combinations thereof. The cores 208, 210 may, for example, execute one or more instructions to move data (e.g., program data, operation code, operand, etc.)

between a cache 209 or a register (not shown) and the memory 206, to read the data from the memory 206, to write the data to the memory 206, to perform an arithmetic operation using the data (e.g., add, subtract, bitwise operation, compare, etc.), to perform a control operation associated with the data (e.g., branch, etc.), and so on, or combinations thereof. The instructions may include any code representation such as, for example, binary code, octal code, and/or hexadecimal code (e.g., machine language), symbolic code (e.g., assembly language), decimal code, alphanumeric code, higher-level programming language code, and so on, or combinations thereof. Thus, for example, hexadecimal code may be used to represent an operation code (e.g., opcode) of an x86 instruction set including a byte value "00" for an add operation, a byte value "8B" for a move operation, a byte value "FF" for an increment/decrement operation, and so on.

The vision enhanced drone system 200 may include one or more drones 212 (e.g., ground terrain and/or aerial based) to capture/record an agricultural environment and one or more crop-related objects in the agricultural environment. The drones 212 may include one or more cameras 214, a camera locator 216 and drone controller 218. The one or more cameras 214 (e.g., RealSense™ DS4 camera) include multiple modes, lens, illuminators (e.g., infrared (IR) and ultraviolet (UV)) and filters to capture images in various spectrums (e.g., visual spectrum, infrared spectrum and ultraviolet spectrum). The one or more cameras 214 may be monoscopic, stereoscopic or multiscopic. The camera locator 216 may provide the inertia data (e.g., gyro and accelerometer, inertial measurement unit (IMU) data), depth data identifying healthy size and shapes of the crops (e.g., captured using an IR projector and IR sensor) and color data (e.g., RGB data) from the drone 212 to various components of the vision enhanced drone system 200. The drone controller 218 may coordinate operations of the drone 212 including the camera 214 and camera locator 216 with various components of the system 200. The drones 212 may include a graphics processing unit (GPU) 252 to perform rapid mathematical calculations, which the drone controller 218, the neural network classifier trainer 240 (discussed below) and/or the object recognizer 226 (discussed below) may use to increase efficiency and performance of the vision enhanced drone system 200.

The vision enhanced drone system 200 may also include a scene perceptor 220 (e.g., RealSense™ Scene Perception component) to receive the inertia data, depth data and color data from the camera locator 216, from which the scene perceptor 220 may generate a 3D map (e.g., mesh of the scene) of the agricultural environment that the vision enhanced drone system 200 may deliver to the graphical interface 222 of the system 200 for a user to view (e.g., via a graphical display).

The vision enhanced drone system 200 may also include a condition analyzer 224 to conduct an analysis of images of crop-related objects in an agricultural environment captured/recorded by the drones 212. The condition analyzer 224 may include an object recognizer 226 to identify the crop-related objects, and one or more agricultural condition classifiers 228 to determine the agricultural conditions of the agricultural environment and the crop-related objects. The agricultural condition classifiers 228 may include a crop disease classifier 230, an animal-imposed damage classifier 232, water-imposed damage classifier 234, an insect-imposed damage classifier 236, as well as other and new damage classifiers 238. The vision enhanced drone system 200 may include a neural network classifier trainer 240 (e.g., one or more neural networks, a deep learning framework such as CAFFE™) to train existing and/or create new agricultural condition classifiers on some frequency and/or as needed.

The object recognizer 226 (e.g., RealSense™ object recognition component) may include an object analyzer 242 to analyze the captured/recorded images of crop-related objects in an agricultural environment to determine one or more attributes of the crop-related objects. The object recognizer 226 may also include an object comparator 244 to compare the captured/recorded images with one or more reference objects, and an object identifier 246 to identify the captured/recorded images based on the object recognizer comparison and the object recognizer analysis. The object recognizer 226 may further include an object recognition trainer 248 and object recognition model 250 to train the object recognizer 226, analyzer 242, object comparator 244 and an object identifier 246 to identify and improve the identification of agricultural environment(s) and crop-related object(s).

The vision enhanced drone system 200 may include object recognition database(s) 254 (e.g., classifier database(s)) that the object recognition trainer 248 may use to train the object recognition model 250, object analyzer 242, object comparator 244 and object identifier 246. The object recognition database(s) 254 may store and/or include images and data about recognized reference objects from various sources including images and data about crop-related objects captured/recorded by the vision enhanced drone system 200 and recognized by the object recognizer 226. The object recognition database(s) 254 (e.g., classifier database(s)) may store and/or include images and data about agricultural conditions from various sources including images and data about agricultural conditions captured/recorded by the vision enhanced drone system 200 and classified by the agricultural conditions classifier 240. The neural network classifier trainer 240 may also use the object recognition database(s) 254 (e.g., classifier database(s)) to train and/or generate the agricultural condition classifiers 228.

The vision enhanced drone system 200 may further include a map enhancer 256 (e.g., a RealSense™ simultaneous localization and mapping/SLAM component) to annotate the 3D map, generated by the scene perceptor 220, with the agricultural conditions of the agricultural environment and the crop-related objects, and communicate the annotated 3D map to the graphical interface 222 (e.g., graphical display of the mobile device) for the user to view. The vision enhanced drone system 200 may include logic 258 to coordinate processing among the various components and/or subsystems of the vision enhanced drone system 200. Moreover, the components of the condition analyzer 224 may generally be implemented in fixed-functionality hardware, configurable logic, logic instructions, etc., or any combination thereof. For example, logic instructions of the condition analyzer 224 might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware of the processor 202.

Figure 3:
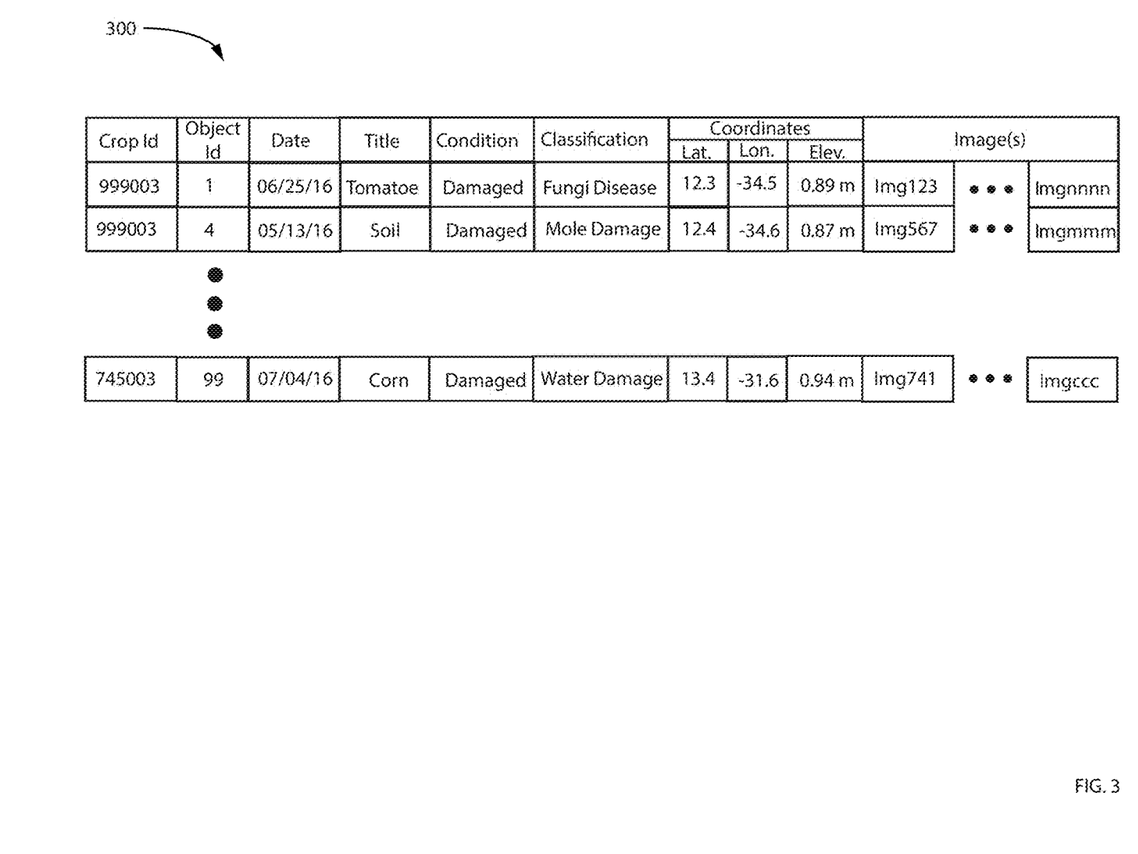
FIG. 3 is block diagram of an example of a crop-related object recognition database according to an embodiment.

Turning now to FIG. 3, a crop-related object recognition database 300 is shown according to an embodiment. A vision enhanced drone system such as, for example, the vision enhanced drone system 102 (FIG. 1) and/or the vision enhanced drone system 200 (FIG. 2), may generally construct records in the database 300 that include various crop-related attributes of recognized crop-related objects captured by the vision enhanced drone system. The crop-related attributes stored in the database 300 may include a crop identifier that may identify a farm (e.g., agricultural environment) and/or user (e.g., farmer), although a user may be identified by one or more crop identifiers where a user is identified by multiple agricultural environments. The crop-related attributes may include a crop-related object identifier for each crop-related object (e.g., a tree, a bush, a plant and/or individual fruit thereof) of an agricultural environment. The crop-related attributes may also include the date on which the vision enhanced drone system captures/records one or more images of the crop-related objects and/or agricultural environment, as well as the condition (e.g., healthy, damaged), classification of damage, if any, and coordinates of the crop-related object (e.g., latitude, longitude and elevation). The vision enhanced drone system may update (by, e.g., adding and/or creating new records corresponding to different dates and times of image capture/recording) the various attributes of the crop-related objects in the recognition database 300 from time to time based on subsequent recordings/imaging captured by the vision enhanced drone system.

Figure 4:
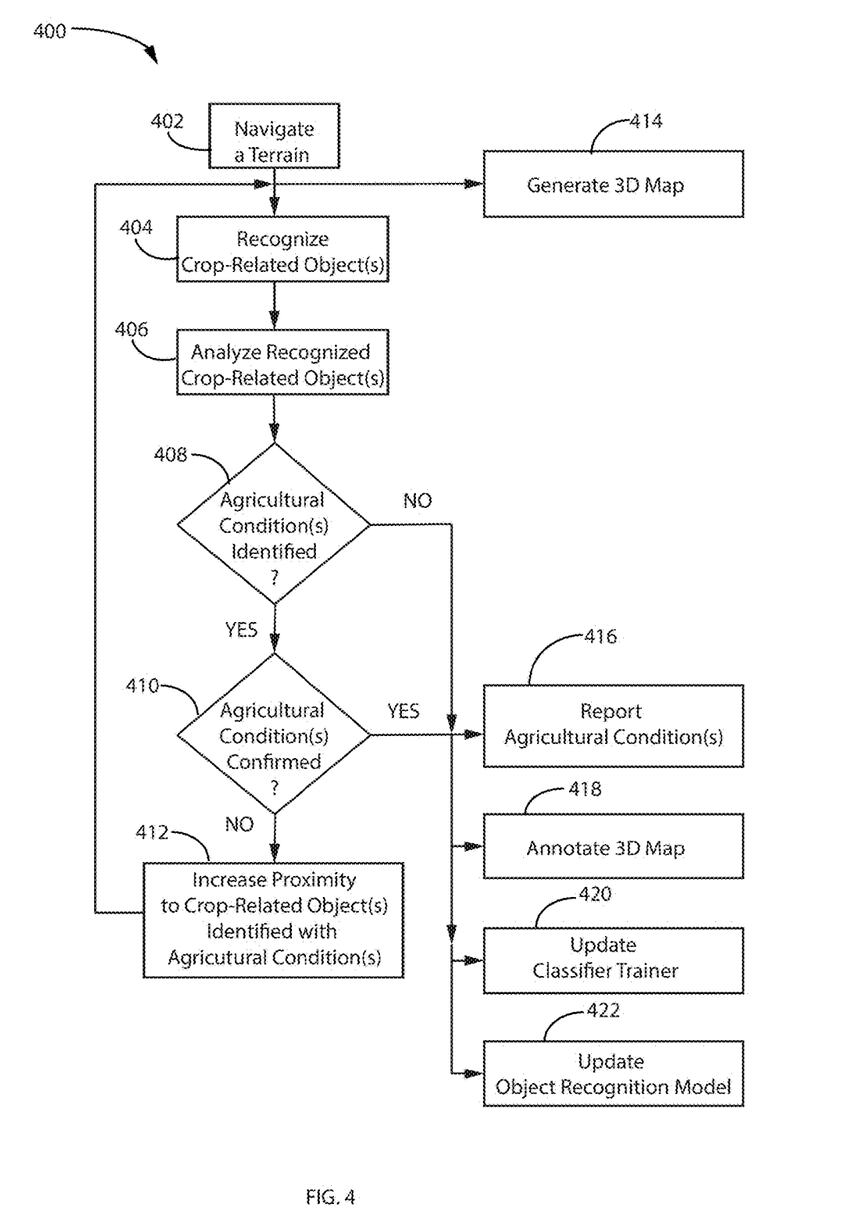
FIG. 4 is a flowchart of an example of a method of constructing a report of agricultural conditions according to an embodiment.

Turning now to FIG. 4, flowchart 400 illustrates an example of a method of constructing a report of agricultural conditions according to an embodiment. The method 400 may generally be implemented in a system such as, for example, the vision enhanced drone system 102 (FIG. 1) and/or the vision enhanced drone system 200 (FIG. 2), already discussed. More particularly, the method 400 may be implemented as a set of logic instructions and/or firmware stored in a machine- or computer-readable storage medium such as random access memory (RAM), read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 400 may be written in any combination of one or more programming languages, including an object oriented programming language such as C++ or the like and conventional procedural programming languages, such as the "C" programming language or similar programming languages.

Illustrated processing block 402 provides navigating the terrain of an agricultural environment to capture/record one or more images of the agricultural conditions of the agricultural environment and the crop-related objects. Illustrated processing block 404 conducts an analysis to recognize the captured/recorded image of one or more of the crop-related objects based on depth data and color data captured/recorded by the one or more drones. Illustrated processing block 406 conducts an analysis on the captured/recorded image of the crop-related objects, and processing block 408 may compare the image of the crop-related objects with images of reference objects and agricultural conditions to determine whether an agricultural condition may be identified for the crop-related object. When the agricultural condition classifier identifies an agricultural condition for the crop-related object, illustrated processing block 410 confirms whether the image of the crop-related objects presents (e.g., exhibits) the agricultural condition, and illustrated processing block 412 causes (e.g., instructs, commands, directs) one or more drones to navigate in increased proximity to the crop-related object to capture/record one or more close images of the crop-related objects to confirm the agricultural condition for the crop-related object.

Illustrated processing block 414 generates a 3D map using the captured/recorded depth data, color data, and inertial data. Illustrated processing block 416 provides for reporting the agricultural conditions of the agricultural environment and the crop-related objects following the agricultural condition classifier comparison of illustrated processing block 408 and/or the confirmation of condition classification of illustrated processing block 410. Illustrated processing block 418 annotates the 3D map with the agricultural condition(s) of the agricultural environment and the crop-related objects. Additionally, block 420 may update the classifier trainer used to train the classifier based on the agricultural condition classifier comparison and/or the confirmation of condition classification of illustrated processing block 408 and/or of illustrated processing block 410. Similarly, illustrated processing block 422 updates the object recognition model used to train the object recognizer based on the condition classifier comparison and/or the confirmation of illustrated processing block 408 and/or of illustrated processing block 410.

Figure 5:
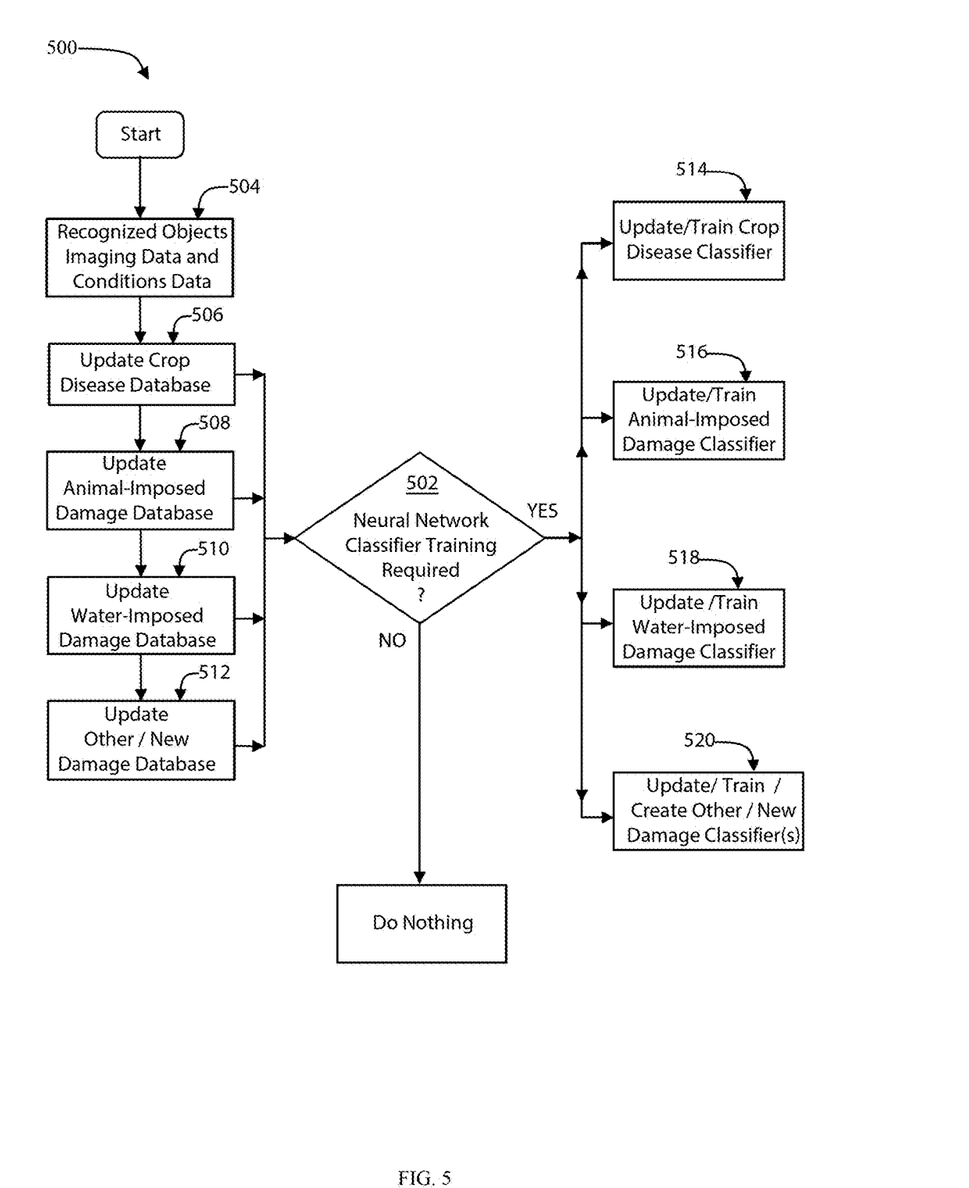
FIG. 5 is a flowchart of an example of a method of training agricultural conditions classifiers according to an embodiment.

Turning now to FIG. 5, flowchart 500 illustrates an example of a method of training agricultural conditions classifiers according to an embodiment. The method 500 may generally be substituted for block 420 (FIG. 4), already discussed. Moreover, the method 500 may be implemented as a set of logic instructions and/or firmware stored in a machine- or computer-readable storage medium such as RAM, ROM, PROM, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 502 uses imaging data and condition classifications data for recognized agricultural environments and crop-related objects. Block 504 may deliver the imaging data and condition classifications data for recognized agricultural environments and crop-related objects to one or more databases in order to train one or more condition classifiers. Illustrated processing block 506 updates crop disease database(s) with the imaging data and condition classifications data that identifies crop disease. Moreover, block 508 may update animal-imposed damage database(s) with the imaging data and condition classifications data that identifies animal-imposed damage. Illustrated processing block 510 may update water-imposed damage database(s) with the imaging data and condition classifications data that identifies water-imposed damage. Block 512 may update other damage database(s) and/or create new damage types database(s) based on the imaging data and condition classifications data that identifies other and/or newly identified types of damage.

Illustrated processing block 514 trains a crop disease classifier with the imaging data and condition classifications data that identifies crop disease from the crop disease database(s). Block 516 may train an animal-imposed damage classifier with the imaging data and condition classifications data that identifies animal-imposed damage from the animal-imposed damage database(s), wherein illustrated processing block 518 trains a water-imposed damage classifier with the imaging data and condition classifications data that identifies water-imposed damage from the water-imposed damage database(s). Additionally, illustrated processing block 520 trains other and/or creates newly identified types of damage classifier(s) with the imaging data and condition classifications data that identifies other and/or newly identified types of damage from the other and/or new damage types database(s).

Figure 6:
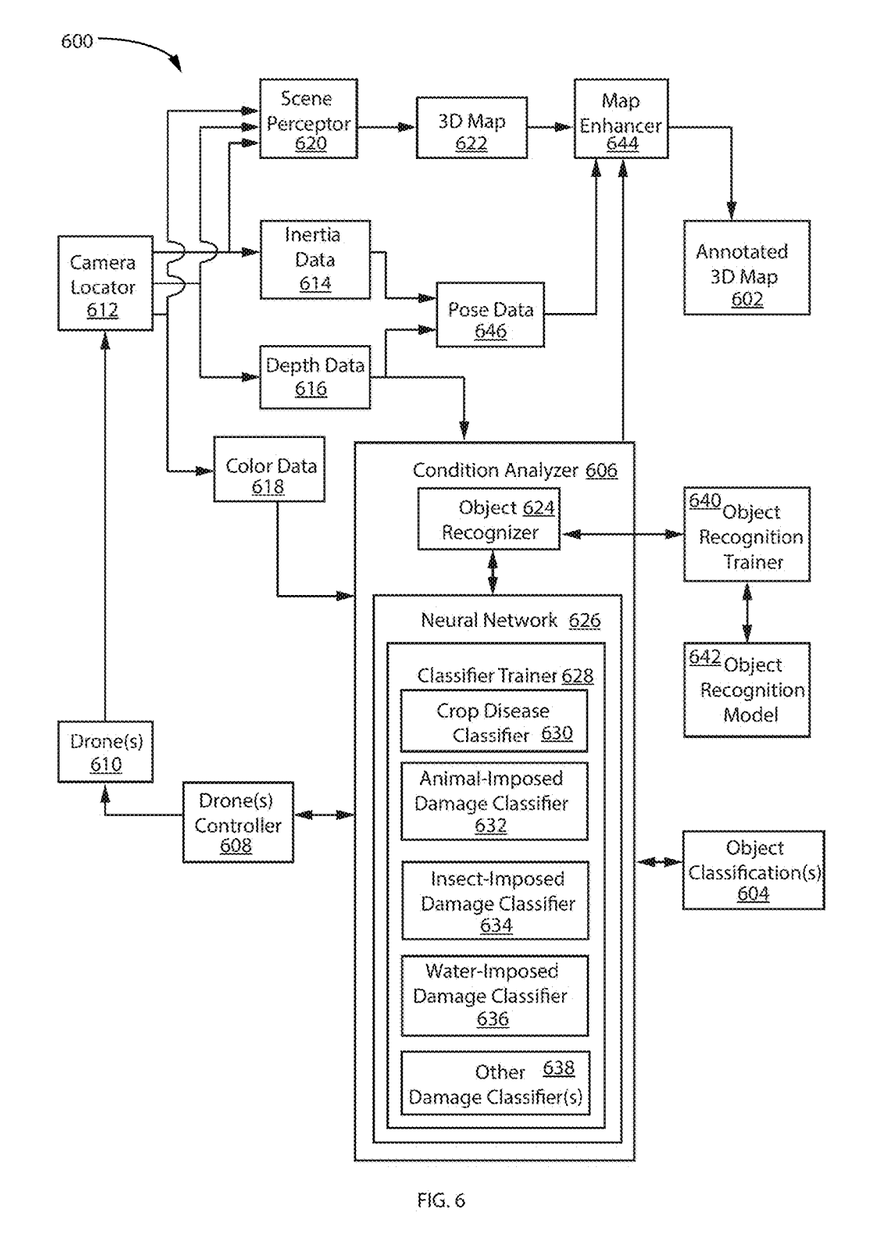
FIG. 6 is a block diagram of an example of an annotated three dimensional (3D) map delivery model according to an embodiment.

FIG. 6 illustrates a block diagram 600 of an example of a model in which an annotated three dimensional (3D) map 602 may be generated with the conditions of crop-related objects according to an embodiment. In the illustrated example, a user of the vision enhanced drone system such as, for example, the vision enhanced drone system 102 (FIG. 1) and/or the vision enhanced drone system 200 (FIG. 2) determines the agricultural conditions of an agricultural environment and the crop-related objects within the agricultural environment, as a result of crop-related object classifications 604 performed by a condition analyzer 606.

A drone controller 608 may control one or more drones 610 to record/capture images of an agricultural environment and the crop-related objects within the agricultural environment. A camera locator 612 may communicate inertia data 614, depth data 616 and color data 618 to a scene perceptor 620 that generates a 3D map 622 of the agricultural environment from the inertia data 614, depth data 616 and color data 618.

The condition analyzer 606 may include an object recognizer 624 to analyze and compare captured/recorded images of the agricultural environment and the crop-related objects with reference and/or identified crop related objects. The condition analyzer 606 may also include a neural network 626 that includes a condition classifier trainer 628 used to train and/or create one or more condition classifiers, including a crop disease classifier 630, an animal-imposed damage classifier 632, an insect-imposed damage classifier 634, water-imposed damage classifier 636, as well as other and/or new damage classifiers 638. The condition classifiers compare the recorded/captured images of the agricultural environment and the crop-related objects with reference objects and/or identified (e.g., recognized) crop-related objects to determine the condition of the agricultural environment and the crop-related objects, resulting in object classifications for the agricultural environment and the crop-related objects. The object recognizer 624 may also be trained by an object recognition trainer 640 and object recognition model 642, which may be updated with image and classification data of recognized agricultural environments and recognized crop-related objects.

The pose data 646 may be determined and/or generated from the inertia data 614, depth data 616 and color data 618 to produce robust six degrees of freedom (6DoF) pose data (e.g., using a RealSense™ simultaneous localization and mapping (SLAM) module). A map enhancer 644 may receive the 3D map 622 from the scene perceptor 620, and using pose data 646 with the results of the object recognition and condition classifications of the condition analyzer 606 produce the annotated 3D map 602.

Figure 7:
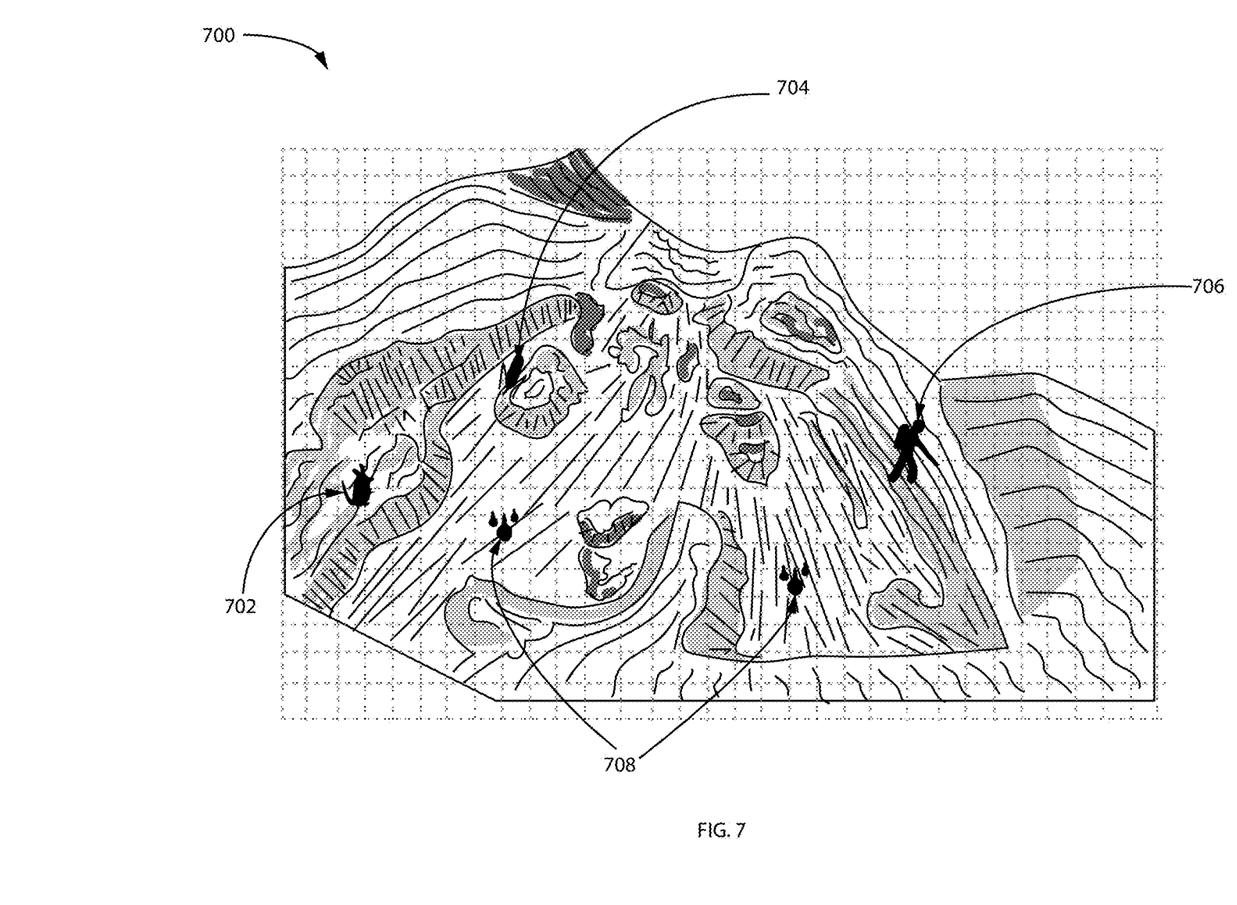
FIG. 7 is an illustration of an example of an annotated 3D map according to an embodiment.

Turning now to FIG. 7, diagram 700 illustrates an example of an annotated 3D map according to an embodiment. The map enhancer 644 may annotate a 3D map generated by the scene preceptor with various icons and/or characters that identify one or more locations where the vision enhanced drone system has identified agricultural conditions such as illustrated by 702 animal-imposed damage, 704 crop disease, 706 other and/or newly identified types of damage (e.g., man-made and/or pesticide imposed damage) and 708 water-imposed damage icons.

Figure 8:
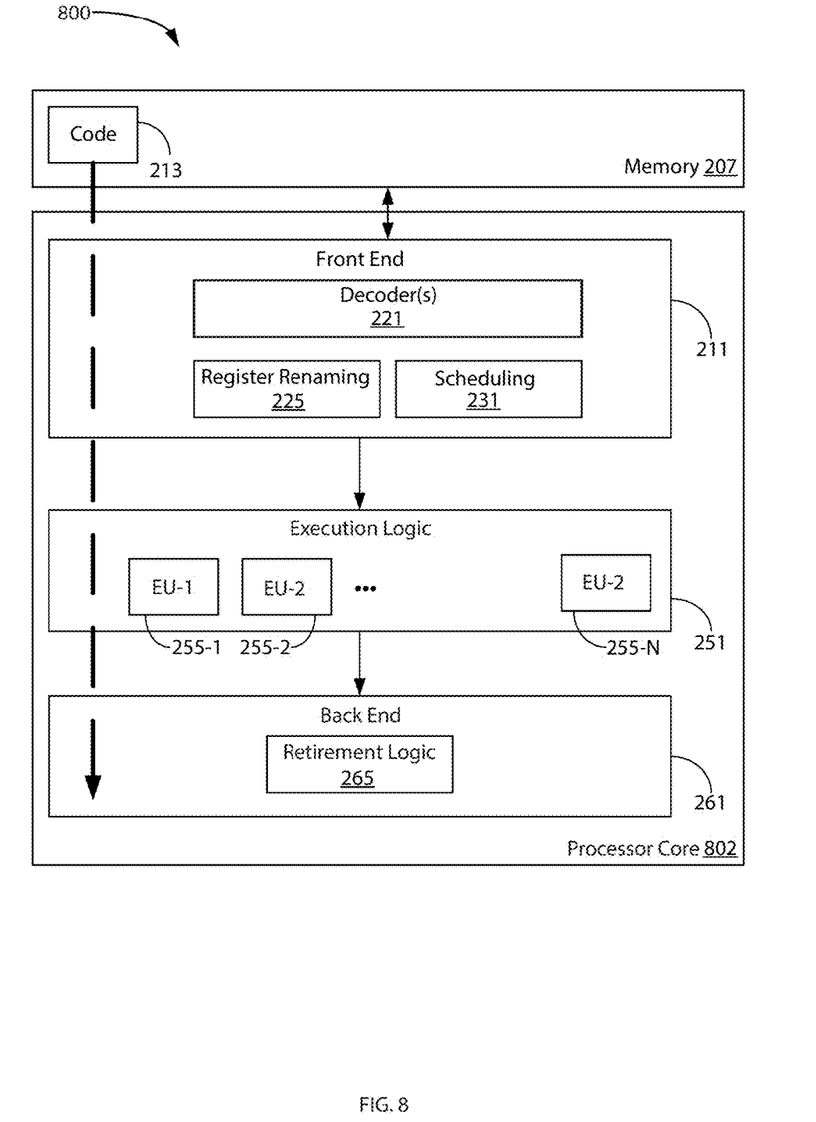
FIG. 8 is a block diagram of an example of a processor according to an embodiment.

FIG. 8 illustrates a block diagram 800 of an example of a processor core 802 according to one embodiment. The processor core 802 may be readily substituted for one or more of the cores 208, 210 (FIG. 2), already discussed, for any type of processor, such as a micro-processor, an embedded processor, a digital signal processor (DSP), a network processor, or other device to execute code. Although only one processor core 802 is illustrated in FIG. 8, a processing element may alternatively include more than one of the processor core 802 illustrated in FIG. 8. The processor core 802 may be a single-threaded core or, for at least one embodiment, the processor core 802 may be multithreaded in that it may include more than one hardware thread context (or "logical processor") per core.

FIG. 8 also illustrates the memory 207 coupled to the processor core 802. The memory 207 may be any of a wide variety of memories (including various layers of memory hierarchy) as are known or otherwise available to those of skill in the art. The memory 207 may include one or more code 213 instruction(s) to be executed by the processor core 802, wherein the code 213 may implement the method 400 (FIG. 4) and/or the method 500 (FIG. 5), already discussed. The processor core 802 follows a program sequence of instructions indicated by the code 213. Each instruction may enter a front end portion 211 and be processed by one or more decoders 221. The decoder 221 may generate as its output a micro operation such as a fixed width micro operation in a predefined format, or may generate other instructions, microinstructions, or control signals which reflect the original code instruction. The illustrated front end 211 also includes register renaming logic 225 and scheduling logic 231, which generally allocate resources and queue the operation corresponding to the convert instruction for execution.

The processor core 802 is shown including execution logic 251 having a set of execution units 255-1 through 255-N. Some embodiments may include a number of execution units dedicated to specific functions or sets of functions. Other embodiments may include only one execution unit or one execution unit that can perform a particular function. The illustrated execution logic 251 performs the operations specified by code instructions.

After completion of execution of the operations specified by the code instructions 213, back end logic 261 retires the instructions of the code 213. In one embodiment, the processor core 802 allows out of order execution but requires in order retirement of instructions. Retirement logic 265 may take a variety of forms as known to those of skill in the art (e.g., re-order buffers or the like). In this manner, the processor core 802 is transformed during execution of the code 213, at least in terms of the output generated by the decoder, the hardware registers and tables utilized by the register renaming logic 225, and any registers (not shown) modified by the execution logic 251.

Although not illustrated in FIG. 8, a processing element may include other elements on chip with the processor core 802. For example, a processing element may include memory control logic along with the processor core 802. The processing element may include I/O control logic and/or may include I/O control logic integrated with memory control logic. The processing element may also include one or more caches.

ADDITIONAL NOTES AND EXAMPLES

Example 1 may include a vision enhanced apparatus comprising a scene perceptor to generate a three-dimensional (3D) map of a terrain based on depth data associated with one or more drones, a condition analyzer to identify one or more agricultural conditions based the depth data and color data associated with at least one of the one or more drones, wherein the condition analyzer includes an object recognizer to recognize one or more crop-related objects, and a neural network to conduct an analysis of the one or more crop-related objects, a map enhancer communicatively coupled to the scene perceptor and the condition analyzer, the map enhancer to annotate the 3D map with the one or more agricultural conditions, and a drone controller to trigger a collection of the depth data at an increased proximity to the one or more crop-related objects based on the one or more agricultural conditions, wherein one or more images associated with the collection are to correspond to an interior space.

Example 2 may include the apparatus of Example 1, further including a classifier trainer to train one or more classifiers of the neural network based on one or more training images of the terrain, and an object recognition trainer to train an object recognition model based on the one or more training images.

Example 3 may include the apparatus of Example 1 to Example 2, further including a camera locator to generate pose data based on the depth data and inertia data associated with the one or more drones, wherein the map enhancer is to annotate the 3D map with the pose data.

Example 4 may include the apparatus of Example 1 to Example 2, wherein the one or more agricultural conditions are to include one or more of crop disease, animal-imposed damage or water-imposed damage.

Example 5 may include a vision enhanced apparatus comprising a scene perceptor to generate a three-dimensional (3D) map of a terrain based on depth data associated with one or more drones, a condition analyzer to identify one or more agricultural conditions based the depth data and color data associated with at least one of the one or more drones, and a map enhancer communicatively coupled to the scene perceptor and the condition analyzer, the map enhancer to annotate the 3D map with the one or more agricultural conditions.

Example 6 may include the apparatus of Example 5, wherein the condition analyzer includes an object recognizer to recognize one or more crop-related objects, and a neural network to conduct an analysis of the one or more crop-related objects.

Example 7 may include the apparatus of Example 6, further including a classifier trainer to train one or more classifiers of the neural network based on one or more training images of the terrain, and an object recognition trainer to train an object recognition model based on the one or more training images.

Example 8 may include the apparatus of Example 5, further including a drone controller to trigger a collection of the depth data at an increased proximity to one or more crop-related objects based on the one or more agricultural conditions.

Example 9 may include the apparatus of Example 8, wherein one or more images associated with the collection are to correspond to an interior space.

Example 10 may include the apparatus of any one of Example 5, Example 7, and Example 9, further including a camera locator to generate pose data based on the depth data and inertia data associated with the one or more drones, wherein the map enhancer is to annotate the 3D map with the pose data.

Example 11 may include the apparatus of any one of Example 5, Example 7, and Example 9, wherein the one or more agricultural conditions are to include one or more of crop disease, animal-imposed damage or water-imposed damage.

Example 12 may include a method comprising generating a three-dimensional (3D) map of a terrain based on depth data associated with one or more drones, identifying one or more agricultural conditions based on the depth data and color data associated with at least one of the one or more drones, and annotating the 3D map with the one or more agricultural conditions.

Example 13 may include the method of Example 12, further including recognizing one or more crop-related objects, and conducting an analysis of the one or more crop-related objects based on a neural network, wherein the one or more agricultural conditions are identified based on the analysis.

Example 14 may include the method of Example 13, further including training one or more classifiers of the neural network based on one or more training images of the terrain, and training an object recognition model based on the one or more training images.

Example 15 may include the method of Example 12, further including triggering a collection of the depth data at an increased proximity to one more crop-related objects based on the one or more agricultural conditions.

Example 16 may include the method of Example 15, wherein one or more images associated with the collection correspond to an interior space.

Example 17 may include the method of any one of Example 12, Example 14, and Example 16, further including generating pose data based on the depth data and inertia data associated with the one or more drones, and annotating the 3D map with the pose data.

Example 18 may include the method of any one of Example 12, Example 14, and Example 16, wherein the one or more agricultural conditions include one or more of crop disease, animal-imposed damage or water-imposed damage.

Example 19 may include at least one computer readable storage medium comprising a set of instructions, which when executed, cause a vision enhanced apparatus to generate a three-dimensional (3D) map of a terrain based on depth data associated with one or more drones, identify one or more agricultural conditions based on the depth data and color data associated with at least one of the one or more drones, and annotate the 3D map with the one or more agricultural conditions.

Example 20 may include the at least one computer readable storage medium of Example 19, wherein the instructions, when executed, cause the vision enhanced apparatus to recognize one or more crop-related objects, and conduct an analysis of the one or more crop-related objects based on a neural network, wherein the one or more agricultural conditions are to be identified based the analysis.

Example 21 may include the at least one computer readable storage medium of Example 20, wherein the instructions, when executed, cause the vision enhanced apparatus to train one or more classifiers of the neural network based on one or more training images of the terrain, and train an object recognition model based on the one or more training images.

Example 22 may include the at least one computer readable storage medium of Example 19, wherein the instructions, when executed, cause the vision enhanced apparatus to trigger a collection of the depth data at an increased proximity to one or more crop-related objects based on the one or more agricultural conditions.

Example 23 may include the at least one computer readable storage medium of Example 22, wherein one or more images associated with the collection are to correspond to an interior space.

Example 24 may include the at least one computer readable storage medium of any one of Example 19, Example 21, and Example 23, wherein the instructions, when executed, cause the vision enhanced apparatus to generate pose data based on the depth data and inertia data associated with the one or more drones, and annotate the 3D map with the pose data.

Example 25 may include the at least one computer readable storage medium of any one of Example 19, Example 21, and Example 23, wherein the one or more agricultural conditions are to include one or more of crop disease, animal-imposed damage or water-imposed damage.

Example 26 may include a vision enhanced apparatus comprising means for generating a three-dimensional (3D) map of a terrain based on depth data to be associated with one or more drones, means for identifying one or more agricultural conditions based on the depth data and color data to be associated with at least one of the one or more drones, and means for annotating the 3D map with the one or more agricultural conditions.

Example 27 may include the apparatus of Example 26, further including means for recognizing one or more crop-related objects, means for conducting an analysis of the one or more crop-related objects based on a neural network, wherein the one or more agricultural conditions are to be identified based on the analysis, means for training one or more classifiers of the neural network based on one or more training images to be of the terrain, and means for training an object recognition model based on the one or more training images.

Example 28 may include the apparatus of Example 26, further including means for triggering a collection of the depth data to be at an increased proximity to one more crop-related objects based on the one or more agricultural conditions, wherein one or more images associated with the collection are to correspond to an interior space.

Example 29 may include the apparatus of Example 26 to Example 28, further comprising means for generating pose data based on the depth data and inertia data to be associated with the one or more drones, and means for annotating the 3D map with the pose data.

Example 30 may include the apparatus of Example 26 to Example 28, wherein the one or more agricultural conditions are to include one or more of crop disease, animal-imposed damage or water-imposed damage.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, the manufactured of devices of smaller size is expected. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" or "at least one of" may mean any combination of the listed terms. For example, the phrases "one or more of A, B or C" may mean A; B; C; A and B; A and C; B and C; or A, B and C. In addition, a list of items joined by the term "and so forth", "and so on", or "etc." may mean any combination of the listed terms as well any combination with other terms.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

I claim:

1. An apparatus comprising:
a scene perceptor, implemented at least partially in one or more of configurable logic or fixed functionality logic hardware, to generate a three-dimensional (3D) map of a terrain based on depth data associated with one or more drones;
a condition analyzer, implemented at least partially in one or more of configurable logic or fixed functionality logic hardware, to identify one or more agricultural conditions based the depth data and color data associated with at least one of the one or more drones, wherein the condition analyzer includes an object recognizer to recognize one or more crop-related objects, and a neural network to conduct an analysis of the one or more crop-related objects;
a camera locator, implemented at least partially in one or more of configurable logic or fixed functionality logic hardware, to generate pose data based on the depth data and inertia data associated with the one or more drones;
a map enhancer, implemented at least partially in one or more of configurable logic or fixed functionality logic hardware, communicatively coupled to the scene perceptor and the condition analyzer, the map enhancer to annotate the 3D map with the one or more agricultural conditions and the pose data; and
a drone controller, implemented at least partially in one or more of configurable logic or fixed functionality logic hardware, to trigger a collection of the depth data at an increased proximity to the one or more crop-related objects based on the one or more agricultural conditions, wherein one or more images associated with the collection are to correspond to a canopied area of an interior space.

2. The apparatus of claim 1, further including:
a classifier trainer, implemented at least partially in one or more of configurable logic or fixed functionality logic hardware, to train one or more classifiers of the neural network based on one or more training images of the terrain; and
an object recognition trainer, implemented at least partially in one or more of configurable logic or fixed functionality logic hardware, to train an object recognition model based on the one or more training images.

3. The apparatus of claim 1, wherein the one or more agricultural conditions are to include one or more of crop disease, animal-imposed damage or water-imposed damage.

4. An apparatus comprising:
a scene perceptor, implemented at least partially in one or more of configurable logic or fixed functionality logic hardware, to generate a three-dimensional (3D) map of a terrain based on depth data associated with one or more drones;
a condition analyzer, implemented at least partially in one or more of configurable logic or fixed functionality logic hardware, to identify one or more agricultural conditions based the depth data and color data associated with at least one of the one or more drones;
a camera locator, implemented at least partially in one or more of configurable logic or fixed functionality logic hardware, to generate pose data based on the depth data and inertia data associated with the one or more drones; and
a map enhancer, implemented at least partially in one or more of configurable logic or fixed functionality logic hardware, communicatively coupled to the scene perceptor and the condition analyzer, the map enhancer to annotate the 3D map with the one or more agricultural conditions and the pose data.

5. The apparatus of claim 4, wherein the condition analyzer includes:
an object recognizer, implemented at least partially in one or more of configurable logic or fixed functionality logic hardware, to recognize one or more crop-related objects; and
a neural network, implemented at least partially in one or more of configurable logic or fixed functionality logic hardware, to conduct an analysis of the one or more crop-related objects.

6. The apparatus of claim 5, further including:
a classifier trainer, implemented at least partially in one or more of configurable logic or fixed functionality logic hardware, to train one or more classifiers of the neural network based on one or more training images of the terrain; and
an object recognition trainer, implemented at least partially in one or more of configurable logic or fixed functionality logic hardware, to train an object recognition model based on the one or more training images.

7. The apparatus of claim 4, further including a drone controller, implemented at least partially in one or more of configurable logic or fixed functionality logic hardware, to trigger a collection of the depth data at an increased proximity to one or more crop-related objects based on the one or more agricultural conditions.

8. The apparatus of claim 7, wherein one or more images associated with the collection are to correspond to a canopied area of an interior space.

9. The apparatus of claim 4, wherein the one or more agricultural conditions are to include one or more of crop disease, animal-imposed damage or water-imposed damage.

10. A method comprising:
generating a three-dimensional (3D) map of a terrain based on depth data associated with one or more drones;
identifying one or more agricultural conditions based on the depth data and color data associated with at least one of the one or more drones;
generating pose data based on the depth data and inertia data associated with the one or more drones; and
annotating the 3D map with the one or more agricultural conditions and the pose data.

11. The method of claim 10, further including:
recognizing one or more crop-related objects; and
conducting an analysis of the one or more crop-related objects based on a neural network, wherein the one or more agricultural conditions are identified based on the analysis.

12. The method of claim 11, further including:
training one or more classifiers of the neural network based on one or more training images of the terrain; and
training an object recognition model based on the one or more training images.

13. The method of claim 10, further including triggering a collection of the depth data at an increased proximity to one more crop-related objects based on the one or more agricultural conditions.

14. The method of claim 13, wherein one or more images associated with the collection correspond to a canopied area of an interior space.

15. The method of claim 10, wherein the one or more agricultural conditions include one or more of crop disease, animal-imposed damage or water-imposed damage.

16. At least one non-transitory computer readable storage medium comprising a set of instructions, which when executed, cause a computing device to:
generate a three-dimensional (3D) map of a terrain based on depth data associated with one or more drones;
identify one or more agricultural conditions based on the depth data and color data associated with at least one of the one or more drones;
generate pose data based on the depth data and inertia data associated with the one or more drones; and
annotate the 3D map with the one or more agricultural conditions and the pose data.

17. The at least one non-transitory computer readable storage medium of claim 16, wherein the instructions, when executed, cause a computing device to:
recognize one or more crop-related objects; and
conduct an analysis of the one or more crop-related objects based on a neural network, wherein the one or more agricultural conditions are to be identified based the analysis.

18. The at least one non-transitory computer readable storage medium of claim 17, wherein the instructions, when executed, cause a computing device to:
train one or more classifiers of the neural network based on one or more training images of the terrain; and
train an object recognition model based on the one or more training images.

19. The at least one non-transitory computer readable storage medium of claim 16, wherein the instructions, when executed, cause a computing device to trigger a collection of the depth data at an increased proximity to one or more crop-related objects based on the one or more agricultural conditions.

20. The at least one non-transitory computer readable storage medium of claim 19, wherein one or more images associated with the collection are to correspond to a canopied area of an interior space.

21. The at least one non-transitory computer readable storage medium of claim 16, wherein the one or more agricultural conditions are to include one or more of crop disease, animal-imposed damage or water-imposed damage.

* * * * *